Sept. 19, 1961 G. BRUCK 3,001,143
LOW NOISE RADIO FREQUENCY AMPLIFIER
Filed Feb. 4, 1959
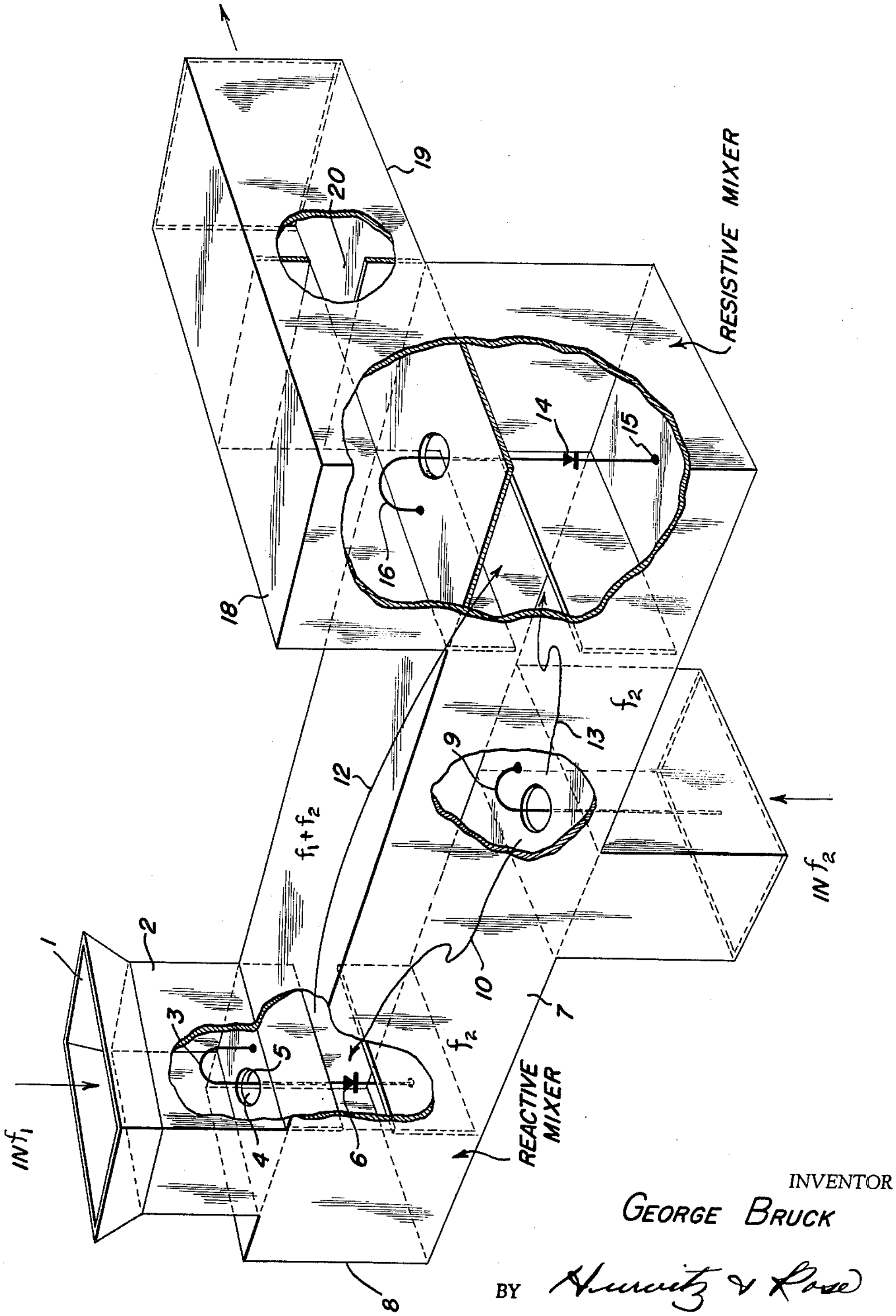
INVENTOR
GEORGE BRUCK
BY Hurwitz & Rose
ATTORNEYS United States Patent Office
3,001,143
Patented Sept. 19, 1961

3,001,143

LOW NOISE RADIO FREQUENCY AMPLIFIER

George Bruck, Wyoming, Ohio, assignor to Avco Manufacturing Corporation, Cincinnati, Ohio, a corporation of Delaware Filed Feb. 4, 1959, Ser. No. 791,077
2 Claims. (Cl. 330—7)

The present invention relates generally to amplifiers, and more particularly to double conversion ultra-high frequency amplifiers providing power or voltage gain and which employ solely passive elements.

It is known that frequency conversion may be effected with power or voltage gain, under certain circumstances, by employing a reactive mixer such as a non-linear voltage sensitive capacitor as a mixing or modulating element. Energy transfer relations and conditions are specified by Manley and Rowe, in Proceedings of the IRE, July, 1956. It is there indicated that in the absence of hysteresis no power may be dissipated in a non-linear reactor, and that therefore the sum of all the input and output powers to the reactor at several input frequencies must be zero. If it be assumed that two generators are coupled to a non-linear reactor at frequencies $f_1$ and $f_2$, it can be shown that flow of energy at frequency $f_1+f_2$ yields a positive contribution to the power entering the non-linear element from both generators, while flow of a difference frequency yields a positive contribution to one generator and a negative contribution to the other. The former case is uniformly stable and the latter unstable under at least some conditions.

Modulators as well as demodulators may operate in inverting and non-inverting modes. If $f_2$ is a local oscillator frequency and $f_1$ a signal input frequency, lower than $f_2$, a modulator or demodulator operates in the non-inverting mode if a sum frequency $f+$ is derived which is higher than $f_2$, while operation is in inverting mode if the converted frequency lies between $f_1$ and $f_2$. In general, in the non-inverting mode the local oscillator frequency lies between the input and output signal frequencies, while in the inverting mode it is greater than either. The terms inverting and non-inverting are derived from the effect which the modulator or demodulator would have on the frequencies of a band of signal frequencies. If these retain their normal relation after frequency conversion, the conversion is non-inverting. If they reverse their normal relation it is inverting.

It can be shown that for the non-inverting mode of operation of a reactive modulator power gain is equal to the ratio of output signal frequency to input signal frequency, and that modulator or demodulator gains are reciprocal. It follows that by operating a non-inverting modulator between widely separated frequencies, considerable power gain may be obtained, i.e., a small energy input signal may control a large energy output signal, the sum of the input powers appearing in the new frequency. The reactive mixer so operated has a low noise figure, approximately 2 or 3 db.

If a local oscillator frequency is employed to supply energy to a reactive mixer supplied with input signal, so as to obtain a sum frequency, and the sum frequency is then re-converted to the original signal frequency in a resistive mixer by means of the same local oscillator frequency, a net power gain may result. To provide an example, a resistive mixer may be arranged to introduce a loss of about 6 db, but a reactive mixer may provide a gain of about 5, so that a net gain of 8 db is feasible, for representative values of input frequency. This gain may be increased by increasing the ratio of signal output to signal input frequencies at the reactive mixer.

To provide a numerical example, it may be desired to amplify 5.2 kmc. Selecting a local oscillator frequency of 21 kmc., modulator output frequency is 21+5.2=26.2 kmc., and gain is $$\frac{26.2}{5.2}=5$$

Demodulator output frequency is 26.2—21=5.2 kmc. obtained with conversion loss of about 6 db. Total gain from the double conversion is then about 8 db.

In accordance with a feature of the present invention, a reactive mixer and a resistive mixer are located within a wave guide. Signal energy at frequency $f_1$ is supplied to the reactive mixer via a branching channel terminating in a horn receiving antenna, for example. Local oscillator signal of frequency $f_2$ is supplied to the wave guide, at suitable energy level, and travels to the reactive mixer, where it effects frequency conversion, resulting in a sum frequency of $f_1+f_2$. By selecting $f_2$ to be much greater than $f_1$ two objectives are simultaneously attained. Firstly, high conversion gain is available, this being equal to the ratio of output to input signal frequencies. Secondly, the wave guide acts as an open channel to the sum frequency, which is adjacent the local oscillator frequency $f_2$, but blocks the difference frequency and the input signal frequency, so that all the input energy to the mixer is converted to useful signal at the sum frequency.

The sum frequency and the local oscillator frequency pass to a resistive mixer located within the wave guide, and from the resistive mixer is abstracted the original signal frequency $f_1$. The latter conversion is accompanied by power loss, but the power loss is less than the power gain in the reactive mixer, so that a net power gain results.

It is, accordingly, a broad object of the present invention to provide a system of amplification employing modulation and demodulation steps, in which two passive non-linear elements are employed as mixers, both mixers responsive to a single local oscillation source, and one of the mixers being reactive and the other resistive.

It is another object of the present invention to provide a micro-wave amplifier employing a single wave guide containing a reactive mixer and a resistive mixer, and into which local oscillator frequency is injected at a location in the wave guide intermediate the mixers, the wave guide providing a channel for energy at both local oscillator frequency and sum frequency output of the reactive mixer, but not for signal frequency and difference frequency.

Still a further object of the invention resides in provision of an amplifier providing power gain by virtue of frequency conversion upwards in a reactive mixer, and deconversion downwards in a resistive mixer, the reactive mixer having greater gain than the resistive mixer has loss.

The above and still further objects, features and advantages of the present invention will become apparent upon consideration of the following detailed description of one specific embodiment thereof, especially when taken in conjunction with the accompanying drawings, wherein:

The single figure of the drawings is a schematic representation of a system according to the invention.

Referring now more particularly to the accompanying drawings, the reference numeral 1 denotes a wave guide horn suitable for receiving micro-wave radiant energy, for example in the range of 5.2 kmc. Energy received by the horn 1 is transmitted via wave guide channel 2 to a coupling loop 3, which communicates via aperture 4 and lead 5 with a reactive mixer 6. The latter may be constituted of a non-linear voltage sensitive capacitor. Suitable materials for the purpose are ceramic dielectrics, selected from among the ferroelectric materials, having a dielectric reactive characteristic which varies with changes in electric field applied thereto. Barium titanates are typical of this class of material, although the invention is not so limited.

The reactive mixer 6 is located internally of a wave guide channel 7, having a closed end 8 adjacent the reactive mixer 6, the latter being connected at one terminal internally of the wave guide channel 7, and at a remaining terminal to lead 5, and thereby to coupling loop 3, which in turn terminates on an exterior wall of the wave guide.

Local oscillator frequency is supplied to the wave guide channel 7 via coupling loop 9. Energy at local oscillator frequency travels to the left, as seen in the figure, following arrow 10, to the reactive mixer 6, where it interacts with incoming energy supplied by coupling loop 3.

The wave guide channel 7 passes local oscillator frequency, as well as the sum of the local oscillator frequency $f_2$ and the signal frequency $f_1$, but stops difference frequencies and the signal frequency $f_1$. In consequence only the sum frequency travels to the right within the wave guide channel, following the arrow 12.

Energy at local oscillator frequency $f_2$ travels to the right from coupling loop 9 following arrow 13, so that both local oscillator frequency and sum frequency arrive at resistive mixer 14, located adjacent the extreme right hand end of wave guide channel 7.

The resistive mixer 14 is connected at one electrode to an interior wall of wave guide 7, as at 15, and at its remaining electrode to an output coupling loop 16. The output coupling loop 16 is located within a resonant cavity 18, tuned to signal frequency $f_1$, so that only energy at the latter frequency is abstracted from the loop. The cavity 18 may be coupled in conventional fashion to a utilization or output conduit, such as wave guide 19, via an aperture 20.

Values of frequencies suitable for employment in the system of the present invention are:

$$f_1 = 5.2 \text{ kmc.}$$
$$f_2 = 21. \text{ kmc.}$$

Since gain of the reactive mixer equals $$\frac{f_1+f_2}{f_1}$$

the suggested frequency values provide a gain of 5, i.e., $$\frac{5.2+21}{5.2}$$

It may be expected that about a 6 db conversion loss may occur within the resistive mixer, for stable operation with optimum drive. A net gain of about 8 db for the system is thereby available. The gain figure can be increased by increasing $f_2$, the local oscillator frequency, and thereby the ratio $$\frac{f_1+f_2}{f_1}$$

This at the same time lightens the bandwidth requirements for the wave guide.

The present invention enjoys an advantage that input signal frequency always equals output signal frequency, regardless of frequency drift of the local oscillator. A noise figure of about 3 db may be attained, and the entire unit may be encompassed in a small volume, and may be located remotely from a utilization device. For example, the unit may be located adjacent a receiving antenna, and may supply amplified signals to a remote receiver.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A low-noise ultra-high-frequency amplifier construction comprising, in combination:

an input conduit for accepting input signals of frequency $f_1$ to be amplified, a resonant output cavity for the transmission of output signals of frequency $f_1$, a source of local oscillations of frequency $f_2$, a wave guide formed with closed ends and first and second apertures adjacent respectively to the input conduit and output cavity, and with a third aperture adjacent the source of local oscillations and intermediate the first and second apertures, a reactive non-symmetrical, non-inverting mixer located in the wave guide and comprising a voltage-sensitive capacitor for converting the input signals to amplified signals of a sum frequency $f_1+f_2$, said wave guide being proportioned to pass signals of a local oscillator frequency and signals of said sum frequency but to reject input signals or signals of the difference frequency, a first coupling loop in series with said reactive mixer and projecting through said first aperture, a resistive mixer located in the wave guide for converting the sum frequency signals to output signals of frequency $f_1$, a second coupling loop in series with said resistive mixer and projecting through said second aperture, and a third coupling loop in series with said source of local oscillations and projecting through said third aperture, the frequency $f_2$ of the source of local oscillations being so great relative to the frequency $f_1$ that the gain of the reactive mixer more than offsets the loss in the resistive mixer.

2. A low-noise ultra-high-frequency amplifier construction comprising, in combination:

an input conduit for accepting input signals of frequency $f_1$ to be amplified, a resonant output cavity for the transmission of output signals of frequency $f_1$, a source of local oscillations of frequency $f_2$, a wave guide first and second coupling means on the wave guide adjacent respectively to the input conduit and output cavity, a third coupling means on the wave guide in circuit with the source of local oscillations and intermediate the first and second coupling means, a reactive non-symmetrical, non-inverting mixer located in the wave guide and comprising a voltage-sensitive capacitor in circuit with the first coupling means for converting the input signals to amplified signals of a sum frequency $f_1+f_2$, said wave guide being proportioned to pass signals of a local oscillator frequency and signals of said sum frequency but to reject input signals or signals of the difference frequency, and a resistive mixer located in the wave guide and in circuit with the second coupling means for converting the sum frequency signals to output signals of frequency $f_1$, the frequency $f_2$ of the source of local oscillations being so great relative to the frequency $f_1$ that the gain of the reactive mixer more than offsets the loss in the resistive mixer.

References Cited in the file of this patent

UNITED STATES PATENTS

| | | |
|---|---|---|
| 1,847,079 | Burton | Mar. 1, 1932 |
| 2,470,893 | Hepp | May 24, 1949 |
| 2,719,223 | Van der Ziel et al. | Sept. 27, 1955 |
| 2,795,648 | Mason | June 11, 1957 |
| 2,806,138 | Hopper | Sept. 10, 1957 |
| 2,835,747 | Cluwen | May 29, 1958 |
| 2,850,585 | Green | Sept. 2, 1958 |
| 2,922,959 | Holloway et al. | Jan. 26, 1960 |
| 2,956,234 | Olsen | Oct. 11, 1960 |

OTHER REFERENCES

Manley et al.: Proceedings of the IRE, July 1956, pages 904–913.

Rowe: Proceedings of the IRE, May 1958, pages 850–860.